Patented July 27, 1937

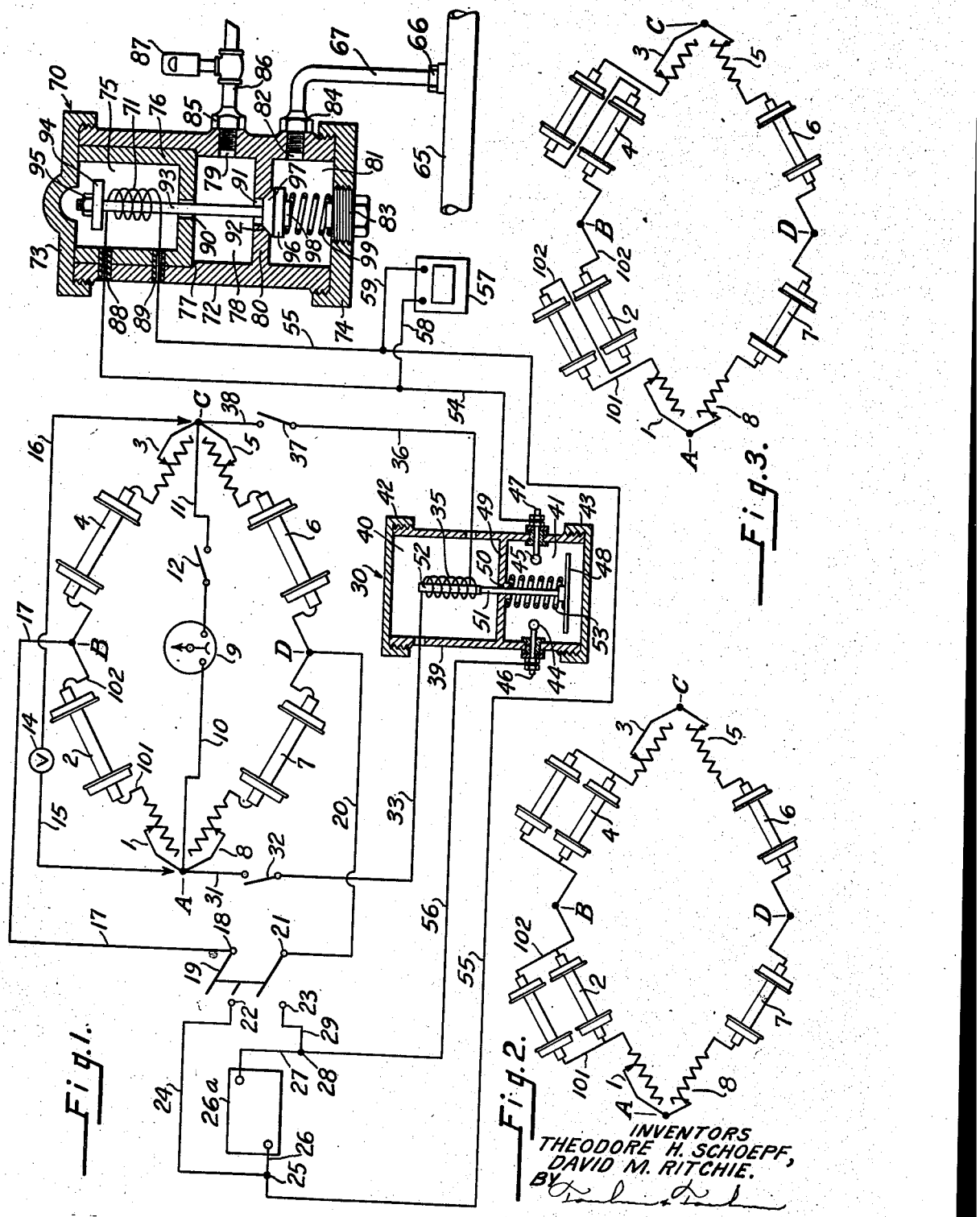

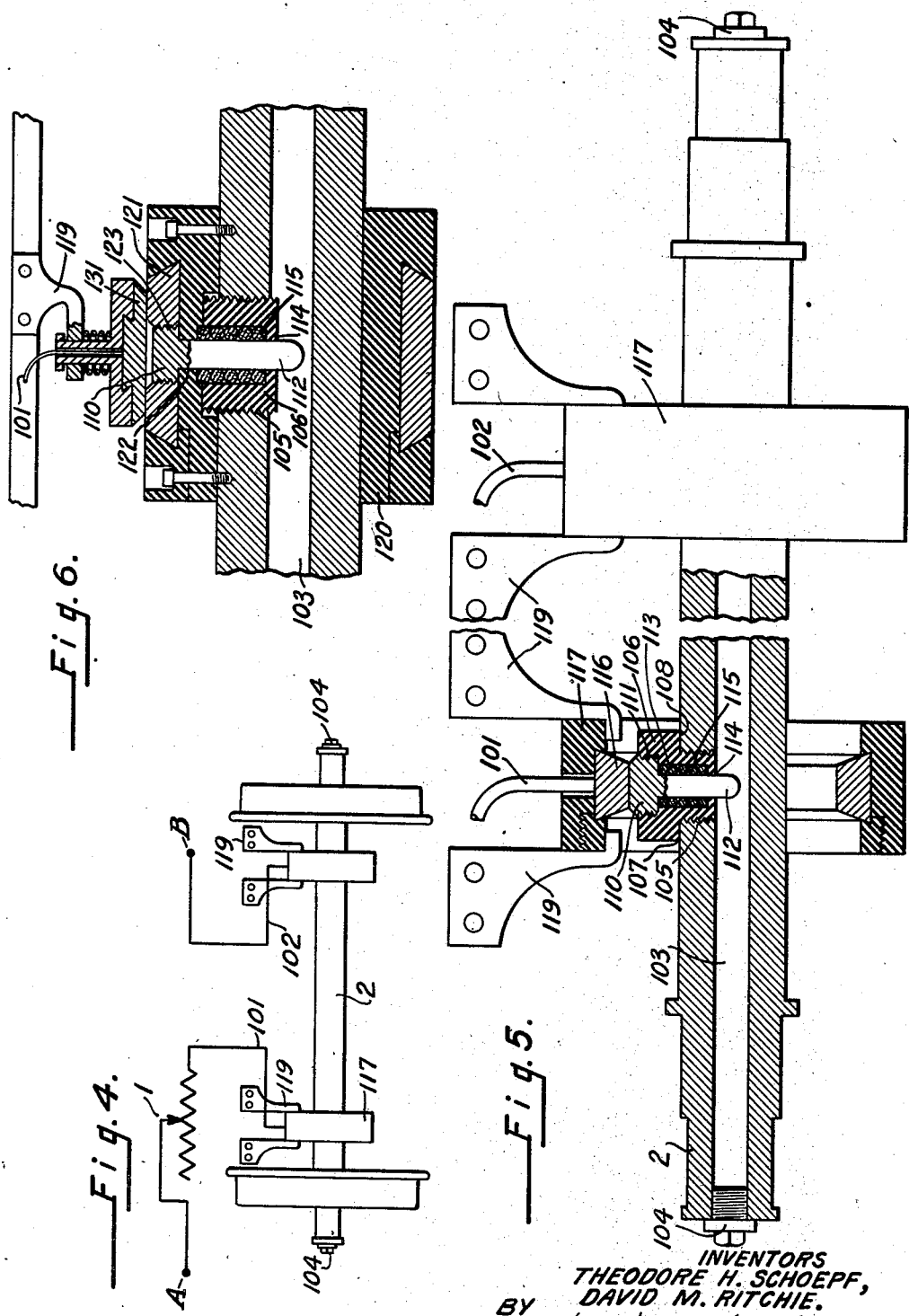

2,088,485

UNITED STATES PATENT OFFICE 2,088,485

SAFETY APPARATUS FOR RAIL VEHICLES

Theodore H. Schoepf and David M. Ritchie, Cincinnati, Ohio, assignors to The Cincinnati Traction Building Co., Cincinnati, Ohio, a corporation of Ohio Application February 17, 1936, Serial No. 64,295

30 Claims. (Cl. 246—169)

Our invention relates to safety apparatus and particularly to such apparatus as applied to rail cars.

The particular object of our invention is to provide means whereby, when an axle breaks, the automatic air brakes on the vehicle and the brakes on the entire train, in which the vehicle is coupled as a unit, will be instantly applied.

It is an object of our invention to provide such means which will be inoperative during normal operation of the vehicle, but which will be made operative by the breakage or cracking of an axle, in operation.

It is a further object of our invention to provide means especially adapted for application to vehicles applied with braking systems, wherein reduction or release of air pressure in the air brake train line causes automatic operation of the brakes of the vehicle.

It is a further object of our invention to provide means including a chamber within the respective axles of the vehicle, which is filled with a non-corrosive low-resistance fluid, the escape of any of which fluid will cause a change of the resistance of a circuit including the fluid, which change in resistance is utilized to cause release or reduction of pressure in the vehicle train line, whereby to automatically cause application of the vehicle brakes.

It is a further object of our invention to provide such means which will operate, upon breakage or fracture of a vehicle axle, to cause automatic simultaneous operation of the brakes of all of the vehicles of the train.

It is a further object of our invention to utilize a Wheatstone bridge having the resistances of the respective vehicle axles included in the respective branches thereof whereby, upon a change of resistance in any axle, due to breakage, the Wheatstone bridge will be unbalanced and current will be caused to flow therethrough, which current is utilized to operate a relay, which relay, in turn, causes operation of a solenoid actuated or electro-responsive valve to release pressure in the vehicle air train line, whereby to automatically apply the brakes of the vehicle.

It is a further object of our invention to provide warning means which is operated by the air escaping from the train line to designate the vehicle in which the breakage has occurred.

It is a further object of our invention to provide warning means in the energizing circuit of the solenoid actuated or electro-responsive valve, whereby to indicate the vehicle in which axle breakage has occurred.

It is a further object of our invention to provide such means for reducing the air brake train line pressure, whereby to automatically apply electromagnetic brakes in systems wherein such brakes are operated either alone or in conjunction with vehicle air brakes upon reduction of pressure in the vehicle air train line.

It is a further object of our invention to provide means whereby the above objects may be achieved in brake systems including air brakes which are applied automatically upon reduction of air train line pressure.

In the operation of railway vehicles, the fracture or rupture of an axle is attended by damage to cargo, rolling stock and permanent way and often by personal injury or loss of life, and necessarily by delay and traffic congestion. We propose to provide and utilize means cooperating with the several axles of a rail vehicle, which will operate, upon the occurrence of rupture or fracture of the axle, before the separation of parts occurs, to automatically and instantaneously apply the air brakes and/or, in some cases, the electromagnetic track brakes of the vehicle, as particularly described in our copending applications Serial No. 64,296 filed Feb. 17, 1936, and Serial No. 64,297 filed Feb. 17, 1936.

Referring to the drawings:

Figure 1 is a diagrammatic view of our invention, showing the Wheatstone bridge, relay, solenoid-actuated valve and connection to the air brake train line and other details of our invention;

Figure 2 is a partial diagrammatic view of the Wheatstone bridge shown in Figure 1, illustrating our method of connecting two vehicle axles in parallel in branches of the bridge, whereby to apply our invention to vehicles having more than four axles;

Figure 3 is a view similar to Figure 2, but showing our method of connecting the resistance elements of two axles in series in a branch of the Wheatstone bridge for the above purpose;

Figure 4 is a diagrammatic elevational view of our means for connecting the axle resistance elements in the branches of the Wheatstone bridge;

Figure 5 is a fragmentary detailed sectional view of the means shown in Figure 4, with one end of the axle broken away;

Figure 6 is a view similar to Figure 5, but showing a different embodiment of our means for connecting the axle resistance elements in the circuit of the Wheatstone bridge.

In the preferred embodiment of our invention, each axle is to be provided with a chamber which is filled with non-corrosive low-resistance fluid. Means is provided, whereby the resistance of this fluid may be inserted in a branch of a Wheatstone bridge and the respective branches balanced whereby, in the normal operation of the vehicle with all axles intact, no current will flow through the branches of the bridge, but wherein, upon breakage, rupture, or fracture of an axle, the escape of fluid which is the resistance element in one branch of the Wheatstone bridge, will cause, through suitable means, release of the normal air brake train line pressure in order that the air brakes or other brakes may be instantaneously and automatically applied on the vehicle so equipped and/or on all vehicles of the train, depending upon whether the separate vehicles have separate air train lines or a common air train line therebetween. The unbalancing of the Wheatstone bridge causes the operation of a relay to complete the energizing circuit for a solenoid-actuated valve which operates, upon energization, to release the pressure in the air train line of the vehicle and cause a suitably attached whistle or siren to be sounded in order to designate the vehicle wherein axle breakage has occurred.

For the purpose of illustration, we disclose two means for connecting the resistance of the non-corrosive low-resistance fluid contained in the axle chamber into desired branches of the Wheatstone bridge. The first means comprises a suitable conducting terminal mounted on the axle and suitably insulated therefrom, which cooperates with a conducting ring or collector which is suitably insulated and supported by bracket means to a desired part of the axle truck frame. (Figure 5). The second means comprises a suitably insulated terminal having one end in contact with the fluid in the axle chamber and the other end attached to a conductor ring suitably supported for rotation with the axle and insulated therefrom. The conductor ring is adapted to cooperate with a collecting shoe which is suitably attached by bracket means to any desired part of the axle truck frame. (Figure 6). It is to be understood that we utilize the above described means in pairs and preferably situated at or adjacent the axle ends, and that we contemplate the use of other widely varying means which may be adapted to perform the same function.

*Electrical mechanisms and connections*

Referring particularly to Figure 1 of the drawings, the Wheatstone bridge has the terminals A, B, C, D. The branch A—B includes the adjustable resistance element or rheostat 1 and the resistance element or resistor of the axle 2. The branch B—C includes the adjustable resistance element or rheostat 3 and the resistance element of axle 4, and the branch C—D includes the adjustable resistance element or rheostat 5 and the resistance element of the axle 6, while the branch D—A includes the resistance element of the axle 7 and the adjustable resistance element or rheostat 8. If desired, we may add a galvanometer 9 connected by the wire 10 to terminal A and by wire 11 to terminal C and preferably employ a switch 12 in the line 11 in order to normally disconnect the galvanometer 9 for a reason which will be obvious. When the switch 12 is closed, the galvanometer will indicate whether or not the branches A—B, B—C, C—D and D—A are balanced, because, when they are unbalanced, current will flow through the branches as will be indicated by the galvanometer if the switch 12 be closed.

As an alternate means of discovering whether or not the branches are balanced, we may use a voltmeter 14 which may be connected by wire 15 to terminal A and by wire 16 to terminal C. The difference in potential between points A and points C will denote an unbalanced condition which may be corrected by suitable adjustment of one or more of the adjustable resistance elements or rheostats 1, 3, 5 or 8 in the respective branches of the bridge. In balancing the bridge, the resistances should be so adjusted that no potential difference will be registered by the voltmeter 14 or, in the case of the use of the galvanometer 9, so that, when the switch 12 is closed, the galvanometer 9 will indicate a balanced condition.

In order to balance the branches of the bridge, it is necessary to energize the bridge and this is accomplished by connecting the terminal B by wire 17 to switch terminal 18 of switch 19, and to connect the terminal D by wire 20 to the terminal 21 of the switch 19. The switch 19 has terminal 22 opposite terminal 18 and terminal 23 opposite terminal 21. The terminal 22 is connected by wire 24 to a terminal 25, which is connected by wire 26 to one terminal of a storage battery or other source of power 26a. The opposite terminal of the source of power 26a is connected by wire 27 to a terminal 28. The terminal 28 is connected by wire 29 to the switch terminal 23. When the switch 19 is closed, the path of current is as follows: from the power source through wire 27 to terminal 28, through wire 29 to switch terminal 23, through switch 19 to terminal 21, through wire 29 to terminal D of the bridge, through the parallel paths of the bridge, from terminal B of the bridge through wire 17 to switch terminal 18, through switch 19 to terminal 22, through wire 24 to terminal 25, and through wire 26 to the power source.

In order to utilize the current flow produced by change of resistance in any of the branches of the Wheatstone bridge, we have provided a relay, generally designated 30, which is energized for a purpose which will be hereinafter described, by said current flow. The terminal A of the bridge is connected by wire 31, switch 32 and wire 33 to a terminal of the solenoid 35 of the relay 30. The other terminal of the solenoid 35 is connected by means of wire 36, switch 37 and wire 38 to the terminal C of the bridge. It will thus be seen that, when the switch 19 is closed and the bridge balanced and energized, a change of resistance in any branch thereof, because of breakage in either of axles 2, 4, 6 or 7, will, when switches 32 and 37 are closed as is their normal position, cause a current flow from the terminal A through wire 31, switch 32 and wire 33 to solenoid 35 and thence through wire 36, switch 37 and wire 38 to bridge terminal C and thence through the bridge back to bridge terminal A. The relay 30 comprises a body 39, a solenoid chamber 40 and a switch chamber 41. The upper end of the solenoid chamber 40 is closed by a cap 42, preferably threadedly attached to the body 39, while the lower or open end of the switch chamber is closed by the cap 43, which is threadedly attached to the body 39.

Extending radially inwardly from the walls of the body 39 in the chamber 41 is a pair of switch contacts 44 and 45, which are suitably insulated from the walls of the body 39 and which are equipped with suitable binding posts 46 and 47 respectively. The contacts 44 and 45 are adapted to be bridged by a switch blade, contactor or disk 48, whereby to complete the circuit therebetween. The solenoid chamber 40 is separated by the radially disposed wall 49 having a bore 50 centrally disposed therein. Adapted for reciprocating movement in the bore 50 is the rod or stem 51, which carries at its upper end the armature 52 of the solenoid 35. Suitably attached to the lower end of the rod or stem 51 is the switch contactor 48, described above. Interposed between the separating wall 49 and the contactor 48, about the stem 51, is the spring 53, which is adapted, when the solenoid is de-energized, to hold the switch contactor 48 out of contact with switch contacts 44 and 45. Upon the energization of the solenoid 35 of the relay 30, the stem 51 is drawn upwardly against the force of spring 53, whereby the switch contactor 48 bridges the switch contacts 44 and 45, whereby to complete the circuit therebetween. The solenoid 35 is energized, as pointed out above, by the flow of current in the branches of the Wheatstone bridge, A, B, C, D, by a change of resistance of one of the axles having their resistance elements connected therein, as pointed out above. The contact 45 is connected by the wire 54, which is connected at one end to the binding post 47, to one terminal of solenoid 71 of the solenoid-actuated or electro-responsive valve, generally designated 70. The other terminal of the solenoid 71 is connected by means of wire 55 to the above described terminal 25 which, in turn, is connected to one terminal of the battery or source of power 26a. The other battery terminal is connected by wire 27 to terminal 28. The terminal 28 is connected by wire 56 to the binding post 46 of the contact 44. A buzzer 57 is connected in the energizing circuit for solenoid 71 as follows: one terminal of the buzzer 57 is connected by the wire 58 to the wire 54, the other terminal of the buzzer 57 is connected by wire 59 to the wire 55. Thus, when the solenoid 71 is energized, the buzzer 57 is operated.

When the solenoid 35 of the relay 30 is energized by flow of current in the Wheatstone bridge, as pointed out above, the stem 51 is drawn upwardly by the attached armature 52 against the pressure of spring 53, whereby the switch contactor 48 bridges contacts 44 and 45. The path of current from the source of power 26a is then as follows: from 26a through wire 27 to contact 28, through wire 56 to contact 44, through contactor 48 to contact 45, through wire 54 to solenoid 71, and back through wire 55 to terminal 25, and through wire 26 to the other terminal of the power source 26a. When the above-described circuit is closed, current from wire 54 will pass through wire 58 to buzzer 57, and thence through wire 59 to wire 55. Upon energization of the above-described circuit of solenoid 71, the solenoid-actuated or electro-responsive valve device 70 releases the pressure in the air brake train line 65, as will be hereinafter fully described.

*Electro-pneumatic devices and connections*

The electro-pneumatic or electro-responsive valve device 70 comprises a body 72 having a cap 73 screw-threaded on the upper end thereof and a cap 74 screw-threaded on the lower end thereof. The interior of the body 73 has therein three chambers. The upper or solenoid chamber 75 is defined by the cup-shaped cylindrical casting 76, which is supported at its lower end on the annular shoulder 77, which is formed on the interior of the body 72. The chamber 75 is adapted to enclose the solenoid 71 and other parts of the solenoid valve actuating mechanism. Below the chamber 75 is the centrally disposed air outlet chamber 78, which has the axially disposed valve outlet passage 79 leading therefrom. The bottom of the casting 76 defines the top of the chamber 78. The bottom of the chamber 78 is defined by a radially disposed wall 80. Below the valve outlet chamber 78 and separated therefrom by the separating wall 80 is the valve inlet chamber 81, which has the bottom thereof defined by the cap member 74. A radially disposed valve inlet passage 82 leads from the chamber 81 to the outside of the body 72. Centrally disposed within the lower cap member 78 is the valve seating and adjusting plug 83. The air train line 65 is connected by means of nipple 66 and pipe 67 to a nipple 84, threaded into valve inlet passage 82. Threaded in the valve outlet passage 79 is a nipple 85, which carries a pipe 86, to which is suitably connected a whistle or siren 87. The wires 54 and 55, which are connected to the solenoid 71, are insulated by means of suitable insulations 88 and 89 respectively, disposed in registering holes extending through the walls of body 72 and casting 76. Centrally disposed in the bottom of casting 76 is a bore 90 which is disposed in alignment with a passage 91, similarly disposed in the separating wall 80. The passage 91 terminates at its lower wall 80 in the frusto-conical valve seat 92. Disposed for reciprocation in passage 91 and bore 90 is a rod or stem 93, which carries, threaded at the top thereof, the armature 94 of the solenoid 71. Also threaded on the stem 93, adjacent the armature 94, is the lock nut 95, which is adapted to lock the armature in any desired adjustment on the stem 93. Suitably secured to the lower end of the stem 93 is the valve member 96, which has a frusto-conical valve surface 97, which is adapted to cooperate with the valve seat 92 to close the passageway 91. On the lower surface of the valve 96 is a circular boss or projection 98, which acts as a spring guide. Disposed between the seat defined by the adjustable plug 83 and the lower surface of the valve 96 with its upper end disposed about the boss or guide 98 is the spring 99, which is adapted normally to urge the valve 96 upwardly to close the passageway 91.

*Operation of electro-pneumatic devices and connections*

The normal position of the parts of the electro-responsive valve or electro-pneumatic device 70 is shown in Figure 1. In the position of the parts there shown, the solenoid 71 is de-energized. The spring 99 urges the valve 96 against its seat 92, thus preventing entry of air under pressure from train line 65, through pipe 67, and inlet passage 82 through inlet chamber 81 into passage 91. Upon energization of the circuit including wires 54 and 55 and solenoid 71, as described above, the solenoid 71 is energized and thrusts the valve stem 93 and valve 96 downwardly against the pressure of spring 99, whereby to allow air to pass from inlet chamber 81, through passage 91, into outlet chamber 78 and thence through outlet passage 79, nipple 85, pipe 86 and whistle 87 to the atmosphere. This releases or reduces the pressure in the air brake train line, whereby the air brakes or, in some cases, the air brakes and/or the electromagnetic track brakes of the vehicle or train, which are connected to the air brake train line 65, are automatically applied.

In Figure 2, we have illustrated an adaptation of our invention to a vehicle having six axles, wherein the electrical mechanisms and connections are the same as those shown in Figure 1, the only difference being that in branches A—B and B—C respectively, an additional axle resistor or resistance element is connected in parallel with those of axles 2 and 4 respectively within the respective branches of the bridge, A, B, C, D. The means of connection is broadly similar to that disclosed in Figure 1, the differences being apparent from examination of Figure 2.

In Figure 3, we have shown another adaptation of our invention to a vehicle having six axles, the resistors of additional axles in the branches A—B and B—C being connected in series with those of axles 2 and 4 respectively, as will be obvious from examination of Figure 3.

The connection in the circuit of the resistance elements or resistors of the additional axles may be compensated for by proper adjustment of the adjustable resistance elements or rheostats 5 and 8 in the branches C—D and D—A, in order to make the resistance value of the branch A—B, B—C, C—D and D—A equal for the balanced condition of the bridge in normal operation. It is to be understood that, where it may be found desirable, we may use one bridge having four branches, such as that disclosed in Figure 1, to control the safety devices of any number of vehicles, where desired, by the connection of axle resistors or resistance elements in any multiple of four or six in the respective branches of the bridge according to the manner disclosed in Figure 2, or that disclosed in Figure 3. It will thus be possible to use only a single Wheatstone bridge, relay and electro-pneumatic valve device for the control of automatic brake application in an entire train, wherein the cars have a single air train line, such as 65, in common.

*Axle resistance means and connections*

While we contemplate the use of any desired type of resistance means on or within the respective axles of the train vehicle and any desirable means of connecting this resistance means to the respective branches of the Wheatstone bridge, we have shown in Figures 4, 5 and 6 two such means wherein the resistance of a non-corrosive low-resistance fluid contained in an axial chamber in the axle is connected into a desired branch of the Wheatstone bridge, according to the teachings of Figure 1, Figure 2 or Figure 3.

With reference particularly to Figure 5, an axial chamber 103 extends throughout the length of the axle 2 and therewithin. The ends of the chamber are closed by suitable plug members 104. Disposed adjacent the ends of the axle are threaded holes 105 adapted to receive plugs 106 of suitable insulating material. The plugs 106 have the lower ends thereof threaded on the outside for engagement with the threads in the holes 105 and have enlarged cylindrical upper ends which are separated from the threaded portions by the shoulder 107, which is adapted to engage an annular flat spot or face 108 on the axle 2 adjacent the hole 105. The plugs 106 and other parts of the structure disposed at opposite ends of axle 2 in Figure 5 are identical, and only one need be described. Each plug 106 is adapted to receive and support therein a conducting terminal 110, which is received in a central stepped bore in the plug 106. The enlarged or head portion of the conducting terminal 110 is screw-threaded in the upper portion 111 of this bore, while the cylindrical portion 112 of the terminal 110 extends through a central bore 113 and the lowest and smallest bore 114, through which it projects into the chamber 103 and the fluid contained therein. Suitable packing 115 is disposed within the central bore 113 of the plug 106 in order to prevent the leakage of the fluid contained in chamber 103.

It will thus be seen that the conducting terminal 110 is rigidly supported for rotation on the axle 2 and is entirely insulated therefrom by the plug 106. As it is well known that electrical current will follow the line of least resistance, it will be understood that the path from one conductor terminal 110 through axial chamber 103 and to the other conductor terminal 110 of the axle 2 provides the path of least resistance from terminal to terminal and that electrical power will, by following the line of least resistance, travel therethrough. Suitably supported about the axle 2 and surrounding the conductor terminal 110 for sliding or brushing contact therewith is the conducting ring or collector ring 116. The collector ring 116 is suitably mounted in a surrounding or insulating ring 117, which is made of insulating or non-conducting material. The insulating ring 117, which is integrally attached to the collector ring 116, is non-rotatably supported by any suitable bracket means, designated 119, on any desired part of the axle truck frame. Leading from one of the collecting rings 116, shown in Figure 5, is a wire 101, while a wire 102 leads from the other collecting ring 116. These wires provide means of connection from the collector rings 116 to the desired branch of the Wheatstone bridge, and are shown in Figures 1, 2 and 3, as connecting the axle 2 in the branch A—B of the bridge.

When the axial chamber 103 of the axle 2 is filled with any desired non-corrosive low-resistance fluid, upon rotation of the axle, the circuit within the branch A—B, as shown in Figure 4 particularly, will be from A through adjustable resistance element or rheostat 1, through wire 101 to collecting ring 116 and thence through conducting terminal 110 into the fluid in chamber 103 and thence through the second conductor terminal 110 to collecting ring 116 and thence through wire 102 to point B. Like circuits between the axles and the other branches of the bridge are contemplated, and the path of the circuit from A to C in either path will be obvious from inspection of Figures 1, 2, 3 and 4.

With reference to Figure 6, we have shown a second embodiment of our invention, wherein the insulating plug 106, screw-threaded into axial hole 105 in the axle 2, is of substantially cylindrical shape having the top portion and top threaded bore omitted therefrom. Disposed about the axle 2 is an insulating band or ring 120 which has suitably received therein and supported thereby an annular conductor ring 121, which is made of suitable conducting material. The conductor ring 121 has a threaded hole 123 extending radially therethrough and in alignment with the bore 122 of the insulating ring 120 and with the bores of the insulating plug 106. The conductor terminal 110 is adapted to extend through the threaded hole 101, the bore 122 and the central bore of insulating plug 106 so that its cylindrical end portion 112 extends into the axial passage 103 of the axle 2. The upper, enlarged portion or head of the conductor terminal 110 is screw-threaded in the threaded hole 123 in the conductor ring 121. Suitable packing 115 is disposed within the counterbore of the insulating plug 106. Any suitable brush, shoe, or collecting device may be utilized to keep the wire 101 electrically connected to the conductor ring 121 during rotation of the axle. The path of electrical power in the embodiment disclosed in Figure 6 will be, as in Figures 4 and 5, from wire 101 through the brush or collector 131 to and through conductor ring 121 and conductor terminal 110 into the fluid in axial chamber 103 and thence through the other conducting terminal 110 to the second conductor ring and thence to the second brush or shoe and to wire 102. The connection of each axle resistor in the respective branches of the Wheatstone bridge is the same as that described above.

It is, of course, understood that the switches 32 and 37 respectively may be omitted from the lines, in which they are shown and that the operation of balancing the branches of the Wheatstone bridge, preliminary to normal operation, may be carried out although the change of the resistance in any of the four branches of the Wheatstone bridge by adjustment of the rheostats 1, 3, 5 or 8, will cause application of the brakes. With the use of the switches 32 and 37, this brake application is prevented during adjustment of the brakes.

A particular advantage of our invention is dependent upon the fact that the formation of a slight fissure or crack in an axle will cause a change in the resistance of the fluid in the axle chamber 103, whereby to cause automatic operation of the air brakes and/or electromagnetic track brakes before serious damage has occurred, by reason of total separation of the axle stubs at either side of the crack or fissure. Furthermore, upon the operation of the brakes, the particular axle which, by cracking, has caused the operation, may be located by adjustment of the adjustable rheostats 1, 3, 5 and 8 of the Wheatstone bridge, whereby to ascertain in which branch the resistance has been increased. This latter branch will be that branch which includes the axle which has cracked or begun to crack.

It will be understood that the above description is illustrative and in no wise limiting and that the structure, which may be used in the practice of our invention, is susceptible of variation within wide limits, and that we desire to comprehend within our invention such modifications as may be necessary to adapt it to varying conditions and uses and which may be embraced within the claims and the scope of our invention.

Having thus fully described our invention, what we claim as new and desire to secure by Letters Patent, is:

1. A safety device for a rail vehicle having an axle, an air train line, and brakes adapted to be automatically applied upon decrease of pressure in the train line, said device comprising electrical resistance means in said axle adapted to be increased upon breakage of the axle and means adapted upon increase of said resistance means to cause decrease of pressure in said air train line, whereby to cause automatic operation of the brakes.

2. A safety device for a train comprising rail vehicles having axles, a common air train line, and brakes adapted to be automatically applied upon decrease of pressure in the train line, said device comprising electrical resistance means in one of said axles adapted to be increased upon breakage of the axle and means adapted upon increase of such resistance means to cause decrease in the pressure in said air train line, whereby to cause automatic operation of the brakes on each vehicle in the train when breakage of said axle occurs.

3. A safety device for a rail vehicle having an axle, an air train line, and brakes adapted to be automatically applied upon decrease of pressure in the train line, said device comprising a resistance element in said axle adapted to be increased upon rupture of said axle, a Wheatstone bridge having said resistance element in one branch thereof and adapted to be unbalanced by increase of said resistance element, and means adapted to be operated by unbalancing of said Wheatstone bridge to decrease the pressure in said air train line, whereby to cause automatic operation of said brakes.

4. A safety device for a train comprising rail vehicles having an axle, a common air train line, and brakes adapted to be automatically applied upon decrease of pressure in the train line, said device comprising a resistor in one of said axles adapted to have its resistance increased upon rupture of said axle, a Wheatstone bridge having the said resistor in one branch thereof and adapted to be unbalanced by increase of the resistance of said resistor, and means adapted to be operated by unbalancing of said Wheatstone bridge to decrease the pressure in said air train line, whereby to cause automatic operation of said brakes.

5. A safety device for a rail vehicle having an axle, an air train line, and brakes adapted to be automatically applied upon decrease of pressure in the train line, said device comprising a resistance element in said axle adapted to have its value increased upon rupture of said axle, a Wheatstone bridge having said resistance element in one branch thereof and adapted to be unbalanced by increase of the value of said resistance element, and means adapted to be operated by unbalancing of said Wheatstone bridge to decrease the pressure in said air train line, whereby to cause automatic operation of said brakes, said last-named means including a relay adapted upon unbalancing of said Wheatstone bridge to energize an electro-pneumatic device adapted, upon energization, to decrease the pressure in said air train line.

6. A safety device for a train comprising rail vehicles having an axle, a common air train line, and brakes adapted to be automatically applied upon decrease of pressure in the train line, said device comprising a resistor in one of said axles adapted to have its resistance increased upon rupture of said axle, a Wheatstone bridge having the said resistor in one branch thereof and adapted to be unbalanced by increase of said resistance, and means adapted to be operated by unbalancing of said Wheatstone bridge to decrease the pressure in said air train line, whereby to cause automatic operation of said brakes, said last-named means including a relay adapted, upon unbalancing of said Wheatstone bridge, to energize an electro-pneumatic device adapted, upon energization, to decrease the pressure in said air train line.

7. In a safety device for a train vehicle having axles, an air brake train line, and brakes adapted to be automatically applied upon decrease of pressure in the train line; a Wheatstone bridge adapted to be unbalanced by increase of the resistance of a resistance element due to breakage of an axle carrying said resistance element, and means operated by said Wheatstone bridge when unbalanced to reduce the pressure in said train line, whereby to cause automatic application of said brakes on the occurrence of axle breakage.

8. In a safety device for a rail vehicle having axles, an air brake train line, and brakes adapted to be automatically applied upon decrease of pressure in the train line; a Wheatstone bridge adapted to be unbalanced by increase of the resistance of a resistance element thereof due to breakage of an axle carrying said resistance element, and means operated by said Wheatstone bridge, when unbalanced, to reduce the pressure in said train line and operate a warning signal whereby to cause automatic application of said brakes and indicate the occurrence of axle breakage.

9. In a safety device for a train comprising rail vehicles having axles, a common air train line, and brakes adapted to be automatically applied upon decrease of pressure in said air train line; a Wheatstone bridge adapted to be unbalanced by increase of the resistance of a resistance element therein due to breakage of an axle carrying said resistance element, and means operated by said Wheatstone bridge when unbalanced to reduce the pressure in said train line whereby to cause automatic application of the train brakes on the occurrence of axle breakage in the train.

10. In a safety device for a train comprising rail vehicles having axles, a common air train line, and brakes adapted to be automatically applied upon decrease of pressure in said air train line; a Wheatstone bridge adapted to be unbalanced by increase of the resistance of a resistance element therein due to breakage of an axle in the train carrying said resistance, and means operated by said Wheatstone bridge, when unbalanced, to reduce the pressure in said common air train line and operate a warning signal, whereby to cause automatic application of said train brakes and indicate the vehicle in which axle breakage has occurred.

11. In a safety device for a rail vehicle having axles, an air brake train line, and brakes adapted to be automatically applied upon decrease of pressure in the train line; means adapted upon the occurrence of axle breakage to cause automatic application of the brakes, said means comprising an electro-pneumatic valve device adapted when energized to release the pressure in said air brake train line, an energizing circuit for said electro-pneumatic valve device, relay means for closing said circuit, and a Wheatstone bridge adapted to be unbalanced by increase of the resistance of a resistor therein due to breakage of an axle containing said resistance to cause said relay means to close said energizing circuit, whereby to cause automatic application of the vehicle brakes upon the occurrence of axle breakage in the vehicle.

12. In a safety device for a rail vehicle having axles, an air brake train line, and brakes adapted to be automatically applied upon decrease of pressure in the train line; means adapted upon the occurrence of axle breakage to cause automatic application of the brakes, said means comprising an electro-pneumatic valve device adapted when energized to release the pressure in said air brake train line and operate a warning signal, an energizing circuit for said electro-pneumatic valve device, relay means for closing said circuit, and a Wheatstone bridge adapted to be unbalanced by increase of the resistance of a resistor thereof due to breakage of an axle containing said resistance to cause said relay means to close said energizing circuit, whereby to cause automatic application of the vehicle brakes and operation of the warning signal upon the occurrence of axle breakage in the vehicle.

13. In a safety device for a train comprising rail vehicles having axles, a common air train line, and brakes adapted to be automatically applied upon decrease of pressure in said air train line; means adapted upon the occurrence of axle breakage to cause automatic application of the brakes, said means comprising an electro-pneumatic valve device adapted when energized to release the pressure in said common air train line, an energizing circuit for said electro-pneumatic valve device, relay means for closing said circuit, and a Wheatstone bridge adapted upon increase of the resistance of a resistance element therein due to breakage of an axle carrying said resistance element to be unbalanced and cause said relay means to close said energizing circuit, whereby to cause automatic application of the train brakes upon the occurrence of axle breakage in the train.

14. In a safety device for a train comprising rail vehicles having axles, a common air train line, and brakes adapted to be automatically applied upon decrease of pressure in said air train line; means adapted upon the occurrence of axle breakage to cause automatic application of the brakes, said means comprising an electro-pneumatic valve device adapted when energized to release the pressure in said common air train line and operate a warning signal, an energizing circuit for said electro-pneumatic valve device, relay means for closing said circuit, and a Wheatstone bridge adapted upon increase of the resistance of a resistance element therein due to breakage of an axle carrying said resistance element to be unbalanced and cause said relay means to close said energizing circuit, whereby to cause automatic application of the train brakes and operation of the warning signal upon the occurrence of axle breakage in the train to stop the train and designate the vehicle thereof in which axle breakage has occurred.

15. In a safety device for a rail vehicle having axles, an air brake train line and brakes adapted to be automatically applied upon decrease of pressure in the train line; electro-pneumatic means adapted upon energization to release the pressure in said air train line and electrical means adapted upon change of resistance of a resistor therein due to breakage of a vehicle axle containing said resistor to energize said electro-pneumatic device, whereby to cause automatic application of the vehicle brakes upon breakage of an axle thereof, said resistor comprising low resistance fluid contained in said axle and adapted, upon occurrence of axle breakage, to leak out and increase the resistance of said resistor.

16. In a safety device for a train comprising rail vehicles having axles, a common air train line, and brakes adapted to be automatically applied upon decrease in pressure in said common air train line; electro-pneumatic means adapted upon energization to decrease the pressure in said common air train line, and electrical means adapted upon unbalancing of resistors therein due to breakage of an axle in a vehicle of the train carrying one of said resistors in the form of a confined low resistance fluid to energize said electro-pneumatic device, whereby to cause automatic application of the train brakes upon breakage of an axle in the train.

17. In a safety device for a train comprising rail vehicles having axles, a common air train line and brakes adapted to be automatically applied upon decrease in pressure in said common air train line; electro-pneumatic means adapted upon energization to decrease the pressure in said common air train line, and electrical means adapted upon breakage of an axle in a vehicle of the train to energize said electro-pneumatic device, said electrical means including a Wheatstone bridge and a resistance element in each axle inserted in a branch thereof, whereby upon breakage of an axle the bridge will be unbalanced and cause energization of said electro-pneumatic device to automatically apply the train brakes.

18. In a safety brake applying device for a rail vehicle comprising electrical means adapted upon increase of the resistance of a resistor to cause automatic application of the vehicle brakes; said electrical resistor comprising a fluid-containing chamber in a vehicle axle, whereby upon breakage of the axle the escape of fluid will increase the resistance of the resistor and cause automatic application of the vehicle brakes.

19. A rail vehicle brake applying device comprising an electro-pneumatic device adapted upon energization to cause automatic application of the vehicle brakes, an electrical means adapted upon breakage of a vehicle axle to cause energization of said electro-pneumatic device; said electrical means comprising a Wheatstone bridge adapted upon being unbalanced to energize said electro-pneumatic device, fluid resistance elements in the vehicle axles, and means for connecting the fluid resistance elements of the rotating axles in branches of said Wheatstone bridge.

20. A rail vehicle brake applying device comprising an electro-pneumatic device adapted upon energization to cause automatic application of the vehicle brakes, and electric means adapted upon breakage of a vehicle axle to cause energization of said electro-pneumatic device; said electrical means comprising a Wheatstone bridge adapted upon being unbalanced to energize said electro-pneumatic devices, fluid resistance elements in the vehicle axles, and means comprising conducting terminals mounted on and insulated from the respective axles in contact with the fluid, and collector rings in brushing contact with said terminals and being connected by wires into said branches of the Wheatstone bridge.

21. A rail vehicle brake applying device comprising an electro-pneumatic device adapted upon energization to cause automatic application of the vehicle brakes, an electrical means adapted upon breakage of a vehicle axle to cause energization of said electro-pneumatic device; said electrical means comprising a Wheatstone bridge adapted upon being unbalanced to energize said device, fluid resistance elements in the vehicle axles, and means for connecting the fluid resistance elements of the rotating axles in branches of said Wheatstone bridge, said last-named means comprising conducting terminals having one end in contact with the fluid and the other rigidly attached to a conductor ring rigidly mounted on an axle and insulated therefrom, and collector means adapted to contact said conductor ring and attached by means of a wire to a branch of the Wheatstone bridge.

22. A rail vehicle brake applying device comprising an electro-pneumatic device adapted upon energization to cause automatic application of the vehicle brakes, an electrical means adapted upon breakage of a vehicle axle to cause energization of said electro-pneumatic device; said electrical means comprising a Wheatstone bridge adapted upon being unbalanced to energize said device, fluid resistance elements in the vehicle axles, and means for connecting the fluid resistance elements of the rotating axles in branches of said Wheatstone bridge, said last-named means comprising conductor means mounted for rotation with the axles having contact with the fluid and insulated from the axle, and collector means having brushing contact with said conductor means and being attached by means of wires in a branch of the Wheatstone bridge.

23. In a braking system for a railway vehicle, an electrical circuit, an axle carrying a resistance element connected in said electrical circuit and adapted to have its resistance changed by axle breakage, and means associated with said electrical circuit for applying the breaks of said system when the electrical system is disturbed by changing the resistance of the resistance element in the axle.

24. In a braking system for a vehicle including a plurality of axles carrying resistors adapted to have their resistances changed by axle breakage, said resistors being electrically connected in a balanced Wheatstone bridge, said bridge being adapted when an axle is broken to become unbalanced, means adapted upon unbalancing of said bridge to cause operation of the brakes of said system, and means of indicating said unbalanced condition of said bridge.

25. In a braking system for a railway vehicle, an electrical circuit, an axle carrying a resistance element inserted in said circuit and adapted to have its resistance changed by axle rupture, and means adapted upon change of said axle resistance to cause application of the brakes of said system.

26. In a braking system for a railway vehicle, an electrical circuit including a Wheatstone bridge, an axle having a resistance element inserted in a branch of said Wheatstone bridge, and means adapted to be inoperative when said Wheatstone bridge is balanced and to operate upon the unbalancing thereof, due to the change of the resistance of the axle resistance element, to cause application of the brakes of the braking system.

27. In a braking system for a railway vehicle, an axle having a fluid resistance element therein and adapted to have its value changed by axle rupture, and means adapted to operate upon change of value of said axle resistance element to cause automatic application of the brakes of said system.

28. In a braking system for a rail vehicle having a plurality of axles carrying fluid resistors adapted to have their resistances changed by axle breakage, circuit means for electrically connecting the resistors of said axles in a balanced Wheatstone bridge, and means adapted upon the unbalancing of said bridge to cause application of the brakes of said system, said last-named means including means for indicating the unbalanced condition of said bridge.

29. In a braking system for a rail vehicle having a plurality of axles carrying fluid resistors adapted to have their resistances changed by axle breakage, means for electrically connecting the resistors of said axles to a balanced Wheatstone circuit, and means adapted upon the unbalancing of said circuit to cause application of the brakes of said vehicle, said last-named means including warning means adapted to indicate said unbalanced condition of said circuit.

30. In a braking system for a rail vehicle having a plurality of axles carrying fluid resistors adapted to have their resistances increased by axle breakage and being electrically connected together in a balanced Wheatstone bridge circuit, means adapted to operate upon unbalancing of said circuit due to axle breakage to cause automatic emergency application of the brakes of said braking system.

THEODORE H. SCHOEPF.
DAVID M. RITCHIE.